United States Patent [19]

Benyo et al.

[11] Patent Number: 5,081,709
[45] Date of Patent: Jan. 14, 1992

[54] INTERCHANGEABLE BELT CLIP FOR A SELECTIVE CALL RECEIVER HOUSING AND CARRYING CASE

[75] Inventors: John R. Benyo; Henry Wandt, both of Boca Raton; Fernando Gomez, West Palm Beach, all of Fla.

[73] Assignee: Motorola, Inc., Schaumburg, Ill.

[21] Appl. No.: 389,462

[22] Filed: Aug. 4, 1989

[51] Int. Cl.$^5$ ............................ A45F 5/00; H04B 1/08
[52] U.S. Cl. .................................. 455/348; 224/252; 455/351
[58] Field of Search ............... 455/346, 347, 348, 349, 455/351; 224/252, 269, 42.45 R, 42.01, 151, 255; 24/3 J

[56] References Cited

U.S. PATENT DOCUMENTS

| | | | |
|---|---|---|---|
| 3,631,994 | 1/1972 | Mackzum, Jr. | 455/351 |
| 4,083,481 | 4/1978 | Selinko | 455/351 |
| 4,641,370 | 2/1987 | Oyamada | 455/348 |
| 4,858,798 | 8/1989 | Siddoway et al. | 224/242 |
| 4,887,753 | 12/1989 | Allen | 224/312 |

Primary Examiner—Reinhard J. Eisenzopf
Assistant Examiner—Chi H. Pham
Attorney, Agent, or Firm—Vincent B. Ingrassia; Thomas G. Berry

[57] ABSTRACT

A selective call receiver and carrying case both include a surface for interchangeably attaching a mounting clip assembly to the selective call receiver housing and the selective call receiver carrying case at the discretion of the user.

19 Claims, 1 Drawing Sheet

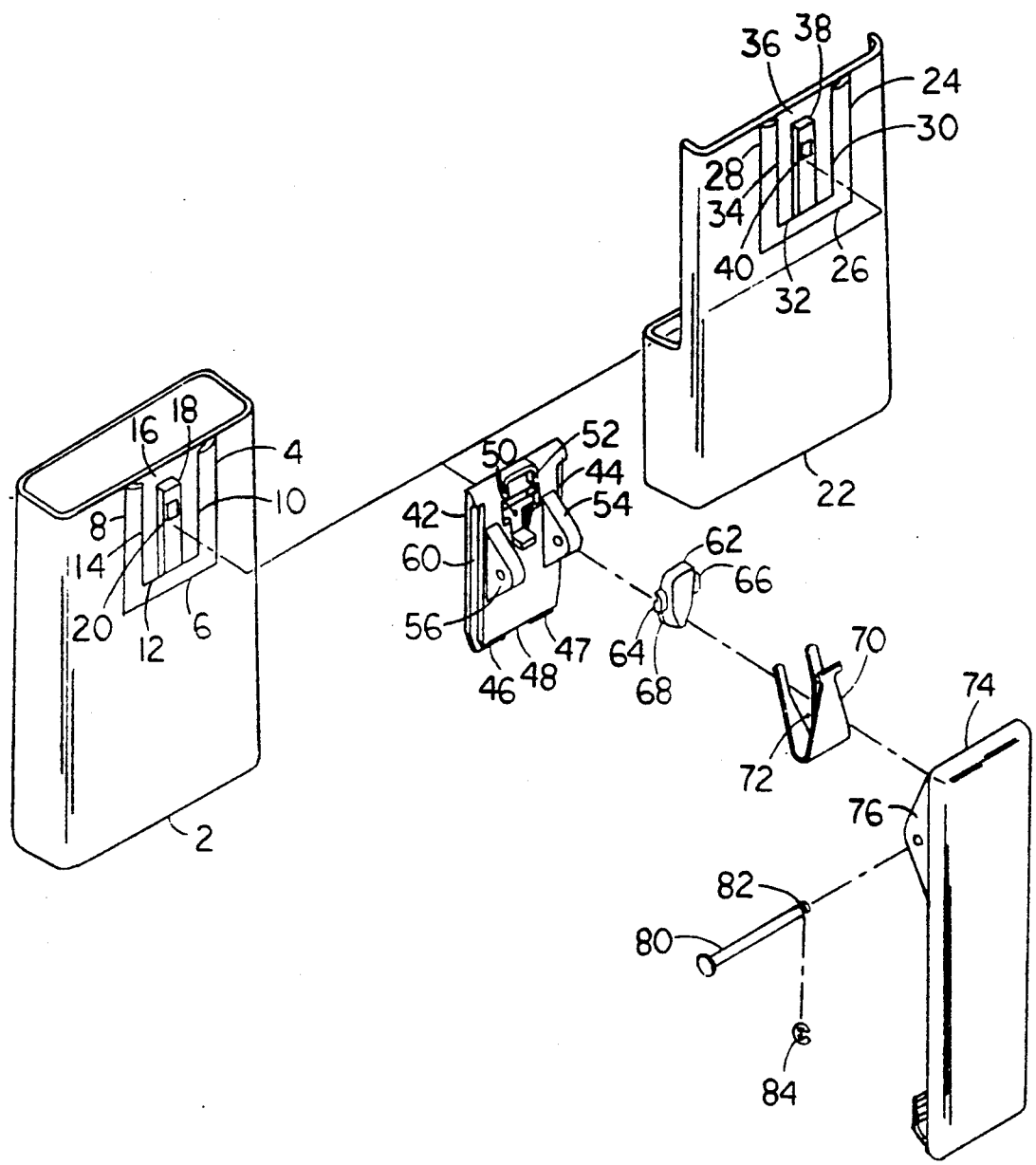

//1//

INTERCHANGEABLE BELT CLIP FOR A SELECTIVE CALL RECEIVER HOUSING AND CARRYING CASE

FIELD OF THE INVENTION

This invention relates in general to a means of attachment, particularly to a mounting clip assembly especially suited for selective call receivers which may be interchanged from the housing of the selective call receiver to its carrying case at the discretion of the user.

BACKGROUND OF THE INVENTION

Conventionally, selective call receivers, also known as pagers, have been worn on the belt regardless of their size or shape. This was the most convenient place to carry a pager since they were relatively large and heavy. In addition, the most common method of receiving a page was by an audio message. Pagers are typically designed with the speaker on top or in front so that the user can clearly hear the message without removing the pager. This system proved to have flaws as audio messages were often entirely or partially missed in noisy environments. This resulted in users getting in the habit of quickly grabbing the pager when a message was received, unclipping it from the belt, and placing it close to the ear to clearly hear a message.

In time, display pagers were developed and afterwards, the carrying case. Display pagers did not eliminate the problems found with audio pagers, but displayed messages gave the user additional time to read the message; therefore, it wasn't critical that the pager have a quick release capability. Even so, the carrying case was necessary since most people were unable to read messages displayed on a device attached to their waist. Though the carrying case is not a standard feature of the display pager, it is available on some models. The carrying case is generally made of the same material as the pager housing and allows for a quick release action of the pager from the carrying case. It includes a belt clip and is attached to the user's belt or other object with the pager then placed in the carrying case. The problem with this system is that the carrying case must accompany the pager if the pager is to have some form of attaching itself to the user.

Because there is a large number of possibilities in pager size and message transmission available to the user, it is difficult to determine which method of carrying or releasing the pager would be most desirable in various situations. Currently, the user does not have the option of choosing the optimal carrying method for the pager depending on the environmental conditions. Users generally have the option of ordering a pager without a belt clip so that it can fit more easily into a pocket or purse. Another option available to the user is to order the pager with a carrying case which has a belt clip permanently attached. Both options limit the user in their ability to carry the pager alone without changing pager housings or purchasing several types of pagers.

In an effort to overcome one or more of the aforementioned drawbacks to conventional detachable mounting clip technologies, U.S. Pat. No. 4,083,481, issued Apr. 11, 1978 and entitled "Detachable Mounting Clip Arrangement for Miniature Portable Apparatus or the like" describes a mounting clip arrangement; however, there are several drawbacks with the invention. The recess formed by the undercut sidewalls on the pager housing is difficult to mold since the slot formed by the sidewalls is recessed with the opening starting in the center of the pager's back surface. In addition, the sidewalls protrude from the back surface of the pager housing providing an edge that could catch on objects because of the orientation of the opening, possibly damaging the user's clothing. In addition, the sidewalls are undesirable aesthetically when the mounting bracket has been removed.

Another attempt to overcome one or more of the aforementioned drawbacks to conventional detachable mounting clip technologies is provided by U.S. Pat. No. 4,641,370, Feb. 3, 1987 and entitled "Housing Assembly for Portable Radio Apparatus with One-Piece Baseplate and Battery Container", yet it too has drawbacks. This design incorporates a bracket as a holder in a similar fashion as the carrying case in the present application yet it does not allow a quick release action of the pager from the holder. In addition, the pager must be placed in the holder to use the belt clip. The belt clip is not directly attachable to the pager housing.

Thus, what is needed is a method of providing an interchangeable belt clip for use with a pager housing and carrying case.

SUMMARY OF THE INVENTION

Accordingly, it is an object of the present invention to provide an improved detachable mounting clip assembly for a pager.

Another object of the present invention is providing a detachable mounting clip arrangement for a pager housing and carrying case.

In carrying out the above and other objects of the invention in one form, there is provided a method for incorporating the mounting clip arrangement on the surface of a pager housing and carrying case such that the mounting bracket is interchangeable with the pager housing and carrying case.

The above and other objects, features, and advantages of the present invention will be better understood from the following detailed description taken in conjunction with the accompanying drawings.

BRIEF DESCRIPTION OF THE DRAWING

The drawing FIGURE is an exploded, isometric view of the construction of a detachable mounting clip assembly in accordance with the preferred embodiment of the present invention for use in conjunction with the pager housing and carrying case.

DETAILED DESCRIPTION OF THE INVENTION

Referring to the FIGURE, the preferred embodiment comprises a radio pager housing 2 and carrying case 22. Pager housing 2 can be carried in three ways: with belt clip 74 attached, without belt clip 74 attached, or without belt clip 74 attached and placed in pager carrying case 22. To carry pager 2 without belt clip 74 attached, pager 2 would be used as shown in the drawing figure. To carry pager 2 with the belt clip attached, the parts would require assembly as described hereinafter. Pager housing 2 includes a slot 16 for slideably attaching mounting bracket 42. Pager housing slot 16 comprises sidewalls 4, 6, and 8. Sidewalls 4, 6, and 8 form tracks 10, 12, and 14, respectively, for slideably engaging mounting bracket blades 44, 46 and 47 combined, and 60, respectively. Mounting bracket 42 has a center slot 48 for slideably engaging rectangular blade 18. Rectangular blade 18 has a cavity 20 for engaging finger 68 of locking mechanism 62. Locking mechanism 62 fits contiguous to circular member 52 of mounting bracket 42. Hinge devices 64 and 66 contiguous to circular member 52 allowing locking mechanism 62 to pivot on the central axis of circular member 52 through opening 50 in mounting bracket 42. Leaf spring 70 contiguous to locking mechanism 62 and mounting bracket 42 as opening 72 is aligned to finger 58, surrounding locking mechanism 62, and placed flush to the surface of mounting bracket 42. Belt clip 74 contiguous to leaf spring 70 and mounting bracket 42. Belt clip 74 includes a pair of members, represented by 76 though one member is not shown. Members 76 form openings that are aligned to openings in members 56 and 54. Pin 80 is inserted into the openings formed by members 76, 56 and 54, and E-ring 84 is then fastened to a circular groove 82 at the end of pin 80. To carry pager 2 in carrying case 22 without belt clip 74 attached, pager 2 would simply be positioned into carrying case 22. If it was desired to use belt clip 74 while pager 2 was positioned in carrying case 22, the assembly would be the same as the assembly of belt clip 74 to pager 2. Carrying case 22 features a slot 36 for slideably attaching mounting bracket 42. Carrying case slot 36 is made up of sidewalls 24, 26, and 28. Sidewalls 24, 26, and 28 form tracks 30, 32, and 34 for slideably engaging mounting bracket blades 44, 46 and 47 combined, and 60, respectively. The assembly of mounting bracket 42 to locking mechanism 62, leaf spring 70, belt clip 74, pin 80 and E-ring 84 would be exactly the same as described above. With both the pager and its carrying case having the ability to receive the same belt clip assembly, the versatility of the pager is improved significantly. The pager can then be carried in any one of several ways depending on the particular variables encountered by the user. These variables may include: method of receiving message, environmental noise level, and the type of clothing available on which to attach the pager. Another advantage to this invention is in manufacturing the product. Conventionally, to offer this level of versatility in carrying a pager would have required the user to purchase several different pager housings if they were even available. Manufacturing costs to carry several variations of a particular pager housing is higher than stocking one pager housing and one pager carrying case. The cost to the user would ultimately be lower and the resulting product more versatile.

By now it should be appreciated that there has been provided a method of incorporating a detachable mounting clip arrangement especially suited for pagers which may be interchanged from the housing of the pager to its carrying case at the discretion of the user.

We claim:

1. A selective call receiver and carrying apparatus, comprising:
   attachment means;
   first mounting means on said selective call receiver for detachably receiving said attachment means;
   a carrying apparatus capable of receiving said selective call receiver including second mounting means on said carrying case for detachably receiving the same attachment means when not coupled to the first mounting means.

2. The selective call receiver and carrying apparatus of claim 1 wherein said attachment means comprises a belt clip.

3. The selective call receiver and carrying apparatus of claim 1 wherein said first and second mounting means detachably receives a mounting bracket of said attachment means.

4. The selective call receiver and carrying apparatus of claim 3 wherein said first and second mounting means comprises a slot formed by at least one sidewall for slideably engaging said mounting bracket of said attachment means.

5. The selective call receiver and carrying apparatus of claim 3 wherein said first and second mounting means comprises at least one track for slideably engaging said mounting bracket of said attachment means.

6. A selective call receiver and carrying apparatus, comprising:
   means for receiving a selective call message, including first mounting means positioned on a surface of the receiving means to removably receive a common attachment means;
   a carrying apparatus for holding the receiving means, including second mounting means positioned on a surface of the carrying apparatus to removably receive the common attachment means;
   the common attachment means for removably attaching to the first and second mounting means to facilitate attachment of the receiving means and carrying apparatus to another object.

7. The selective call receiver and carrying apparatus of claim 6 wherein said attachment means comprises a belt clip.

8. The selective call receiver and carrying apparatus of claim 7 wherein said attachment means comprises a mounting bracket.

9. The selective call receiver and carrying apparatus of claim 8 wherein said first and second mounting means comprises a slot formed by at least one sidewall for slideably engaging said mounting bracket of the attachment means.

10. The selective call receiver and carrying apparatus of claim 8 wherein said first and second mounting means comprises at least one track for slideably engaging said mounting bracket of the attachment means.

11. The selective call receiver and carrying apparatus according to claim 8 further comprising means for biasing said belt clip means to said mounting bracket.

12. The selective call receiver and carrying apparatus in accordance with claim 11 wherein said biasing means comprises a spring.

13. A selective call receiver and carrying apparatus, comprising:
   a belt clip capable of being selectively mounted on the selective call receiver or the carrying apparatus;
   a first mounting means on a surface of said selective call receiver for detachably receiving said belt clip;
   a second mounting means on a surface of said carrying apparatus for detachably receiving said belt clip.

14. The selective call receiver and carrying apparatus of claim 13 wherein said first and second mounting means comprises a slot formed by at least one sidewall for slideably engaging said belt clip.

15. The selective call receiver and carrying apparatus of claim 13 wherein said first and second mounting means comprises at least one track for slideably engaging said belt clip.

16. The selective call receiver and carrying apparatus according to claim 13 further comprising means for biasing said belt clip.

17. The selective call receiver and carrying apparatus in accordance with claim 16 wherein said biasing means comprises a spring.

18. A selective call receiver and carrying apparatus, comprising:
    a selective call receiver and carrying apparatus each including means for detachably receiving a common attachment means; and
    the common attachment means capable of being removably coupled to the selective call receiver when attachment of the selective call receiver to another object is desired, and the attachment means being removably coupled to the carrying apparatus when attachment of the carrying apparatus to another object is desired.

19. A selective call receiver and carrying apparatus, comprising:
    a selective call receiver and carrying apparatus each including means for detachably receiving an attachment means capable of being selectively mounted on the selective call receiver or the carrying apparatus; and
    the attachment means capable of being removably coupled to the selective call receiver when not attached to the carrying apparatus, and the attachment means capable of being removably coupled to the carrying apparatus when not attached to the selective call receiver.

* * * * *